(12) United States Patent
Brogan et al.

(10) Patent No.: US 12,706,467 B2
(45) Date of Patent: Aug. 11, 2026

(54) CONTROLLING AN ENERGY STORAGE DEVICE

(71) Applicant: Siemens Gamesa Renewable Energy A/S, Brande (DK)

(72) Inventors: Paul Brian Brogan, Killearn (GB); Thyge Knueppel, Værløse (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 1296 days.

(21) Appl. No.: 17/610,461

(22) PCT Filed: Apr. 17, 2020

(86) PCT No.: PCT/EP2020/060834
§ 371 (c)(1),
(2) Date: Nov. 11, 2021

(87) PCT Pub. No.: WO2020/233915
PCT Pub. Date: Nov. 26, 2020

(65) Prior Publication Data

US 2022/0255340 A1 Aug. 11, 2022

(30) Foreign Application Priority Data

May 20, 2019 (EP) .................................... 19175375

(51) Int. Cl.

| | |
|---|---|
| ***H02J 3/30*** | (2026.01) |
| ***H02J 3/32*** | (2026.01) |
| ***H02J 7/34*** | (2006.01) |
| *H02J 101/28* | (2026.01) |

(52) U.S. Cl.
CPC ................ *H02J 7/345* (2013.01); *H02J 3/30* (2013.01); *H02J 3/32* (2013.01); *H02J 2101/28* (2026.01)

(58) Field of Classification Search
CPC ...... H02J 7/345; H02J 3/30; H02J 3/32; H02J 2300/28
USPC ................ 320/128, 132, 133, 157, 161, 166
See application file for complete search history.

(56) References Cited

U.S. PATENT DOCUMENTS

| | | | | |
|---|---|---|---|---|
| 6,385,056 | B1 * | 5/2002 | Gucyski .................. | H02J 9/061 363/15 |
| 2009/0140576 | A1 * | 6/2009 | Yu ............................ | H02J 3/28 290/7 |
| 2009/0230689 | A1 | 9/2009 | Burra et al. | |

(Continued)

FOREIGN PATENT DOCUMENTS

| | | | |
|---|---|---|---|
| CN | 101534013 | A | 9/2009 |
| CN | 101878575 | A | 11/2010 |

(Continued)

OTHER PUBLICATIONS

European Search Report issued on Oct. 28, 2019 for application No. 19175375.5.

(Continued)

*Primary Examiner* — Drew A Dunn
(74) *Attorney, Agent, or Firm* — Schmeiser Olsen PLLC

(57) ABSTRACT

Provided is a method of controlling an energy storage device arranged to provide frequency support for an AC power system, the method including: setting an amount of energy stored in the energy storage device depending on a power system frequency of the AC power in the AC power system.

12 Claims, 3 Drawing Sheets

(56) References Cited

U.S. PATENT DOCUMENTS

Figure 1:
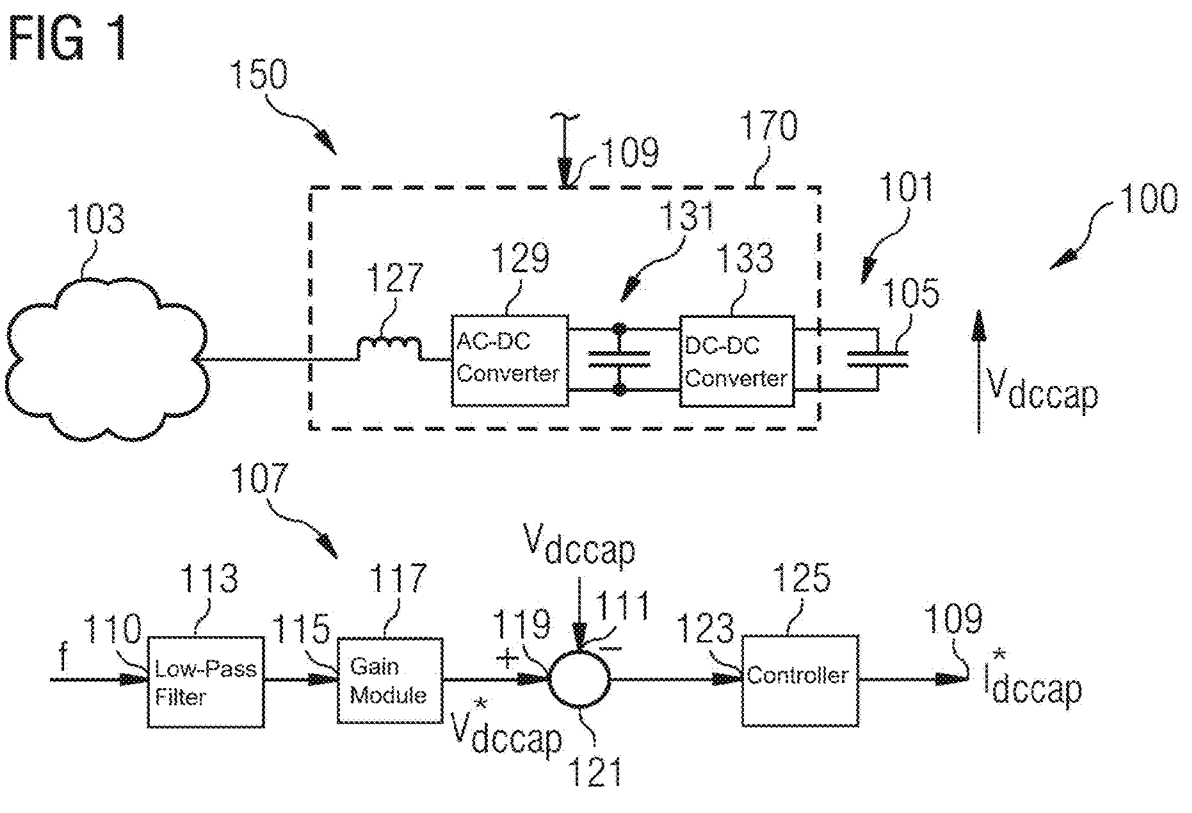

| | | | | |
|---|---|---|---|---|
| 2010/0090532 | A1* | 4/2010 | Shelton | H02J 3/32 307/46 |
| 2012/0326641 | A1 | 12/2012 | Sakai et al. | |
| 2015/0073610 | A1* | 3/2015 | Schnetzka | H02J 3/381 700/287 |
| 2015/0120070 | A1 | 4/2015 | Tarnowski | |
| 2016/0079778 | A1* | 3/2016 | Howe | H02J 3/32 320/167 |
| 2016/0149417 | A1* | 5/2016 | Davis | H02J 7/0019 320/162 |
| 2022/0216696 | A1* | 7/2022 | Brogan | H02J 3/32 |

FOREIGN PATENT DOCUMENTS

| | | | |
|---|---|---|---|
| CN | 102035213 | A | 4/2011 |
| CN | 104321944 | A | 1/2015 |
| CN | 106374496 | A | 2/2017 |
| WO | 2007/104167 | A1 | 9/2007 |
| WO | 2018055594 | A1 | 3/2018 |

OTHER PUBLICATIONS

Alvarez R et al: “Modular multi level converter with short-time power intensive electrical energy storage capability” 2015 IEEE Electrical Power and Energy Conference (EPEC). IEEE. Oct. 26, 2015 (Oct. 26, 2015).

International Search Report and Written Opinion for PCT/EP2020/060834 issued May 18, 2020.

Jianlin Li et al.; Frequency modulation technology of battery energy storage system; Oct. 2018.

* cited by examiner

FIG 5

560
559
503
559
569
562
559
563
565
567
561
Generator
Converter
500

CONTROLLING AN ENERGY STORAGE DEVICE

CROSS-REFERENCE TO RELATED APPLICATIONS

This application claims priority to PCT Application No. PCT/EP2020/060834, having a filing date of Apr. 17, 2020, which claims priority to EP Application No. 19175375.5, having a filing date of May 20, 2019, the entire contents both of which are hereby incorporated by reference.

FIELD OF TECHNOLOGY

The following relates to a method and to an arrangement of controlling an energy storage device arranged to provide frequency support for an AC power system. Further, the following relates to an energy storage system comprising the arrangement and further relates to a wind turbine comprising the energy storing system.

BACKGROUND

An AC-power system (also referred to as utility grid) provides electric energy to plural consumers and receives electrical energy from plural energy production facilities, such as wind turbines. Under normal operation condition, the AC power system has nominal values of electrical quantities, such as a nominal frequency and/or nominal voltage. In case of disturbances in the AC power system the AC power system frequency may deviate from the nominal frequency and/or the voltage may deviate from the nominal voltage. In this situation, the energy production facilities are required to provide inertial energy or inertial response (e.g., instantaneous or very fast response) to the AC power system in order to restore frequency and/or voltage to the nominal values.

In cases such as unbalance of energy consumed and supplied, slower changes of the frequency may be observed and primary and secondary responses may be applied. In order to provide this AC power system support or utility grid support, the energy production facilities need to have a resource for transient, additional active and/or reactive energy. In case of a frequency drop below the nominal frequency of the AC power system, the energy production facilities have to provide additional active power, thus, need to have a resource for additional active power. In case of a frequency increase beyond the nominal frequency of the AC-power system the energy production facilities are required to absorb or receive some active energy from the AC-power system, thus, a require to have some energy storage sink capacity.

In particular, for virtual synchronous machine network converter control systems sufficient energy storage sink/source capability is needed to provide inertial energy to the AC power system in response to dynamic changes in the AC power system frequency. Conventionally, energy storage devices, such as a capacitor or additional energy producing facilities, such as a diesel-motor have been utilized.

It has however been observed that the conventional systems and methods have disadvantages, such as regarding lifetime of the utilized energy storage devices. Thus, there may be a need for a method and an arrangement of controlling an energy storage device arranged to provide frequency support for an AC power system, wherein the disadvantages observed for the conventional systems and methods are reduced.

SUMMARY

An aspect relates to a method of controlling an energy storage device arranged to provide frequency support for an AC power system, the method comprising: setting an amount of energy stored in the energy storage device depending on a power system frequency of the AC power in the AC power system.

The method may for example be performed by a controller of an energy production facility, such as a wind turbine. The energy storage device is capable of storing electric energy directly or of converting electric energy into mechanical energy and storing the mechanical energy. The controlling of the energy storing device may relate to controlling a charging or discharging of the energy storage device.

The energy storage device is arranged to provide frequency support for the AC power system. For example, in case of a frequency drop of the AC power system below the nominal frequency, the energy storage device may provide additional active energy to the AC power system in order to restore the frequency to the nominal value. In case of a frequency increase beyond the nominal frequency of the AC power system, the energy storage device may receive some active energy from the AC power system to restore the frequency to the nominal value.

The energy storage device may additionally be configured to provide voltage support in that it may be capable, alternatively or additionally, to provide additional reactive power or absorb reactive power from the AC power system.

Setting the amount of energy stored in the energy storage device may involve charging or discharging the energy storage device. There may be a pre-given relationship between the power system frequency and the amount of energy to be stored in the energy storage device. The amount of energy stored in the energy storage device may be such that the higher the power system frequency the higher the amount of energy stored in the energy storage device.

The energy storage device may be implemented in different forms such as by an energy storage device directly storing electric energy or by an energy storage device for example storing mechanical energy, in particular rotational energy. When the energy storage device is a device directly storing the electric energy, for example comprising an energy storage capacitor, the voltage of the energy storage medium (supercapacitors, electrolytic capacitors, batteries) may be regulated or set in proportion to the system AC frequency.

Embodiments of the present invention avoid to unnecessarily charge the energy storage device in cases where this exceeding charging is not required. When the energy storage device is not exceedingly charged, the lifetime of the energy storage device may be prolonged. The charging state of the energy storage device may dynamically be changed in dependence of the power system frequency.

According to an embodiment of the present invention the setting the amount of energy stored in the energy storage comprises: deriving a charging or discharging action depending on the power system frequency and a charging state indicating signal of the energy storage device.

The deriving the charging of discharging action may involve deriving a charging or discharging current for a capacitor for example or deriving a torque for a flywheel for example. Further, it may include deriving a voltage of the energy storage capacitor for example. Deriving the charging or discharging action may involve operating a controller which may have at its input an error signal, such as a voltage error signal or a rotational speed error signal of a capacitor or a flywheel, respectively. Thereby, the amount of energy stored in the energy storing device may be set in a simple manner.

According to an embodiment of the present invention, wherein deriving a charging or discharging action comprises: deriving a control signal depending on the power system frequency and the charging state indicating signal; controlling an energy supply device, connected to exchange energy with the energy storage device, based on the control signal.

In the case the energy storage device an energy storage capacitor, the charging state indicating signal may for example be or comprise the voltage of the energy storage capacitor. In case the energy storage device comprises a flywheel, the charging state indicating signal may for example be or comprise a rotational speed of the flywheel. The control signal may for example relate to a charging/discharging current in case the energy storage device comprises a capacitor. In case the energy storage device comprises a flywheel, the control signal may for example relate to a torque which is to be applied at the flywheel, wherein for example positive torque may indicate a desired acceleration and negative torque may indicate a desired deceleration.

The energy supply device may comprise in case the energy storage device is a capacitor, a transformer and/or AC-DC converter or a DC-DC converter which may be connected to the AC power system. The energy supply device in case the energy storage device comprises or is a flywheel, may comprise an AC-DC converter and/or a DC-AC converter and/or a motor or generator which are coupled between the flywheel and the AC power system.

According to an embodiment of the invention, the energy supply device comprises an AC-DC converter connected to the AC power system and further comprises a DC link connected to the AC-DC converter. The AC-DC converter may comprise plural controllable switches wherein for each phase, for example in total three phases, a series connection of two controllable switches may be provided. Thereby, the method may be implemented with conventionally available components.

According to an embodiment of the present invention, wherein the energy storage device comprises an energy storage capacitor, in particular a supercapacitor and/or electrolytic capacitor, wherein setting the amount of energy stored in the energy storage device depending on the power system frequency comprises setting a voltage of the energy storage capacitor depending on the AC power system frequency.

The energy storage capacitor is an example of an energy storage device which directly can store electric energy. The electric energy E stored in the energy storage capacitor may be related to the voltage U by the following equation, wherein C denotes the capacity of the capacitor: $E=C\times U^2$. In particular, the voltage of the energy storage capacitor may be set to be proportional to the AC power system frequency. Thus, there may be a linear relationship between the AC power system frequency and the voltage of the energy storage capacitor in embodiments of the present invention.

According to an embodiment of the present invention, the energy supply device further comprises a DC-DC converter connected to the DC-link, the DC-DC converter being connected to the energy storage capacitor, wherein the AC-DC converter and/or DC-DC converter is controlled by the control signal, in particular for controlling the voltage at the energy storage capacitor.

In this case there may be two DC link systems. The main converter (e.g., AC-DC converter) which is connected to the electrical power system must maintain a DC link voltage (the main DC link voltage) close to 1 per unit in order to control current. Via the (second) DC-DC converter, which is connected between the main DC link and energy storage capacitor (e.g., supercapacitor) the voltage across the supercapacitor can be controlled independently from the main DC link voltage using the DC-DC converter.

The AC-DC converter, the DC link and the DC-DC converter may be in this order connected between the AC power system and the energy storage capacitor. The one or more converter(s) may be suitable devices for controlling the charging state of the energy storage capacitor. They may be supplied with respective signal(s) such as a control signal indicating a charging or discharging current. Thereby, a simple manner of implementation the method is provided.

According to an embodiment of the present invention, the energy supply device comprises a (tap) transformer connected to the power system, the AC-DC converter being connected to the (tap) transformer.

The transformer ratio of the transformer may be fixed or changeable, and the AC-DC converter controls the DC link voltage across the supercapacitors. Thus, the AC-DC converter may be controlled by the control signal to set the voltage at the DC-side. This voltage controlled to vary from approx. 1 per unit to 0.5 per unit, thus allowing the capacitor to discharge releasing 75% of its energy. It's the AC-DC power converter which may receive the control signal to modify the DC link voltage. So, in this case the main DC link voltage may change with system frequency.

Thereby, the voltage applied at the energy storage capacitor may be set in dependence of the AC power system frequency.

According to an embodiment of the present invention, wherein the energy storage device comprises an energy storage flywheel, wherein the energy supply device further comprises a DC-AC converter connected to the DC-link, the DC-AC converter being connected to a flywheel driver for the flywheel, wherein the AC-DC converter and/or DC-AC converter and/or the flywheel driver is controlled by the control signal for controlling a rotational speed of the flywheel.

The AC-DC converter, DC-link, the DC-AC converter may be connected in this order between the AC power system and the flywheel. The flywheel may comprise the flywheel driver, such as an electric motor. Thereby, the control signal supplied to the flywheel driver may for example define the torque which is to be set or which has to be applied to the flywheel, in order to accelerate or decelerate the flywheel in order to set the particular amount of energy (here a rotational energy) which depends on the AC power system frequency. Thereby, a further alternative implementation may be provided.

According to an embodiment of the present invention, wherein the frequency signal is obtained by measuring the power system frequency and low pass filtering the measured power system frequency or using an internally (e.g., controller) derived view of the system frequency.

The system frequency may for example be measured at a point of common coupling or at a point beyond the point of common coupling to which plural wind turbines may be connected or it may be measured locally.

According to an embodiment of the present invention the charging state or amount of energy of the energy storage device or voltage at the energy storage device is set such that the higher the power system frequency, in particular above a nominal power system frequency, the higher the charging state or amount of energy of the energy storage device or voltage at the energy storage device, and/or wherein the charging state or amount of energy of the energy storage device or voltage at the energy storage device is set such that the lower the power system frequency, in particular below a nominal power system frequency, the lower the charging state or amount of energy of the energy storage device or voltage at the energy storage device.

Thereby, according to an embodiment of the present invention, the energy storage device is not exceedingly charged in situations of the AC power system where this exceeding charging is not required. Thereby, the lifetime of the energy storage device may be extended.

According to an embodiment of the present invention, wherein the charging state or amount of energy of the energy storage device is set such that the closer the power system frequency to an upper power system frequency limit, the higher the charging state or amount of energy of the energy storage device or voltage at the energy storage device, and/or wherein the charging state or amount of energy of the energy storage device is set such that the closer the power system frequency to a lower power system frequency limit, the lower the charging state or amount of energy of the energy storage device or voltage at the energy storage device.

The inventors observed that the additional energy to be supplied from the energy storage device or to be absorbed by the energy storage device is related to a difference between the actual AC power system frequency and limit values which are conventionally defined for an AC power system. For most AC power systems an upper limit and a lower limit of the AC frequency exists, for example for the United Kingdom, the nominal frequency is 50 Hz, and the upper limit is 52 Hz, and the lower limit is 47 Hz. The maximum change in system frequency is thus 52 Hz to 47 Hz=5 Hz. For a given inertial constant H, an energy of E=(f0^2−(f0−Deltaf)^2)/f0*Sbase*H, joules is required to be exchanged between the energy storage and the AC system in response to a frequency change of DeltaF (deviation of the power system frequency from the nominal frequency f0).

However, it is only necessary to store the sufficient energy for this delta 5 Hz when the AC system frequency is at its maximum, namely 52 Hz, as this is the only frequency at which a delta of 5 Hz frequency change can occur. Similarly, when the frequency is a 47 Hz, the only way the frequency can change is to increase. Thus, it is not necessary to store sufficient energy for the worst case 5 Hz change in system frequency (sink and source capacity) across the entire frequency range.

According to an embodiment of the present invention the energy storage device and the energy supply device are arranged to supply active energy to the AC power system, if the power system frequency falls below the nominal power system frequency, wherein the energy storage device and the energy supply device are arranged to receive active energy from the AC power system, if the power system frequency exceeds above the nominal power system frequency.

Alternatively, the energy supply device can be configured to supply energy at any time if the rate of change of frequency is positive, even if the frequency is greater than nominal, and sink (receive) energy, if the rate of change of frequency is negative even if the frequency is less than nominal.

Also, the control of the supply or the reception of energy to the AC power system or from the AC power system, respectively may be accomplished by appropriately controlling the AC-DC converter and/or the DC-AC converter and/or the DC-DC converter and/or the flywheel driver.

It should be understood that features, individually or in any combination described, disclosed, explained or provided for a method of controlling an energy storing device arranged to provide frequency support for an AC power system may also, individually or in any combination, be applied or provided for an arrangement for controlling an energy storage device according to embodiments of the invention and vice-versa.

According to an embodiment of the present invention, it is provided an arrangement for controlling an energy storage device arranged to provide frequency support for an AC power system, the arrangement comprising a processing module adapted to set an amount of energy stored in the energy storage device depending on a power system frequency of the AC power in the AC power system.

Furthermore, an energy storage system is provided which comprises an energy storage device and an arrangement according to the preceding embodiment.

Furthermore, it is provided a wind turbine, comprising a rotation shaft to which plural rotor blades are connected; a generator, in particular synchronous generator, driven by the rotation shaft; a converter connected to the generator and connectable to an AC power system; and an energy storage system according to the preceding embodiment.

Embodiments of the present invention are now described in accordance with the accompanying drawings. The invention is not limited to the illustrated or described embodiments.

BRIEF DESCRIPTION

Figure 2:
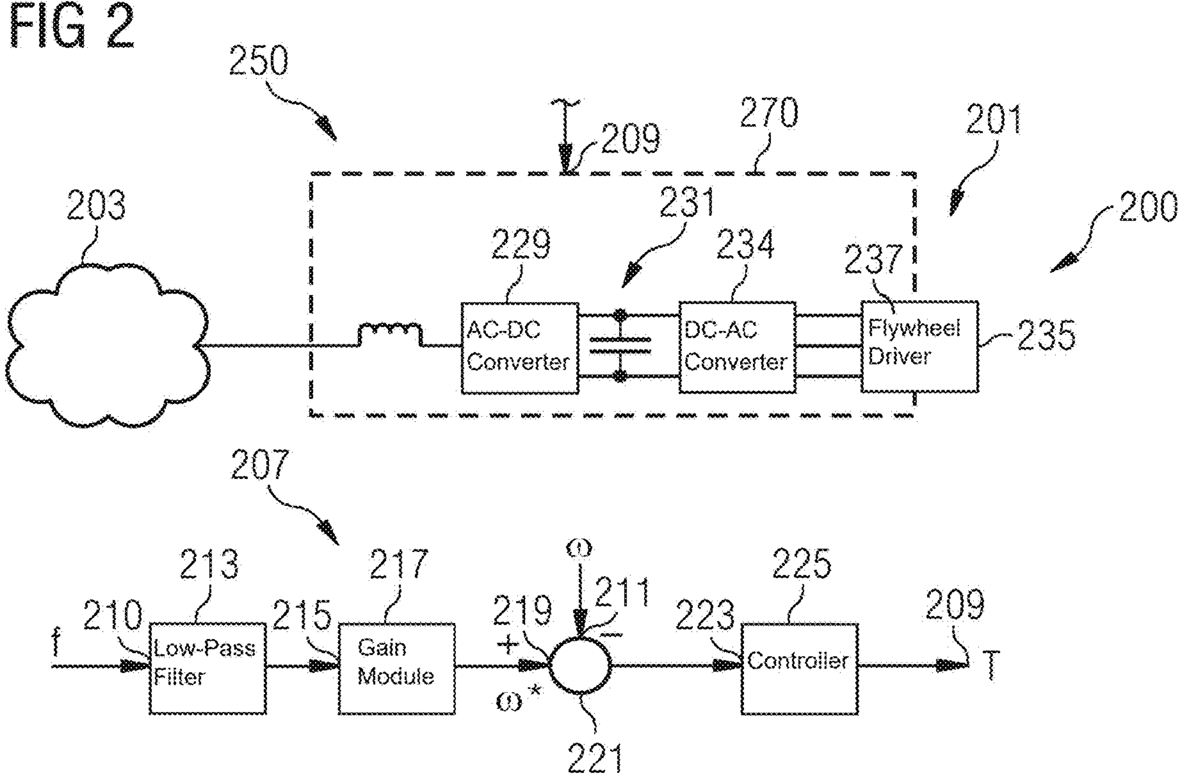
Figure 3:
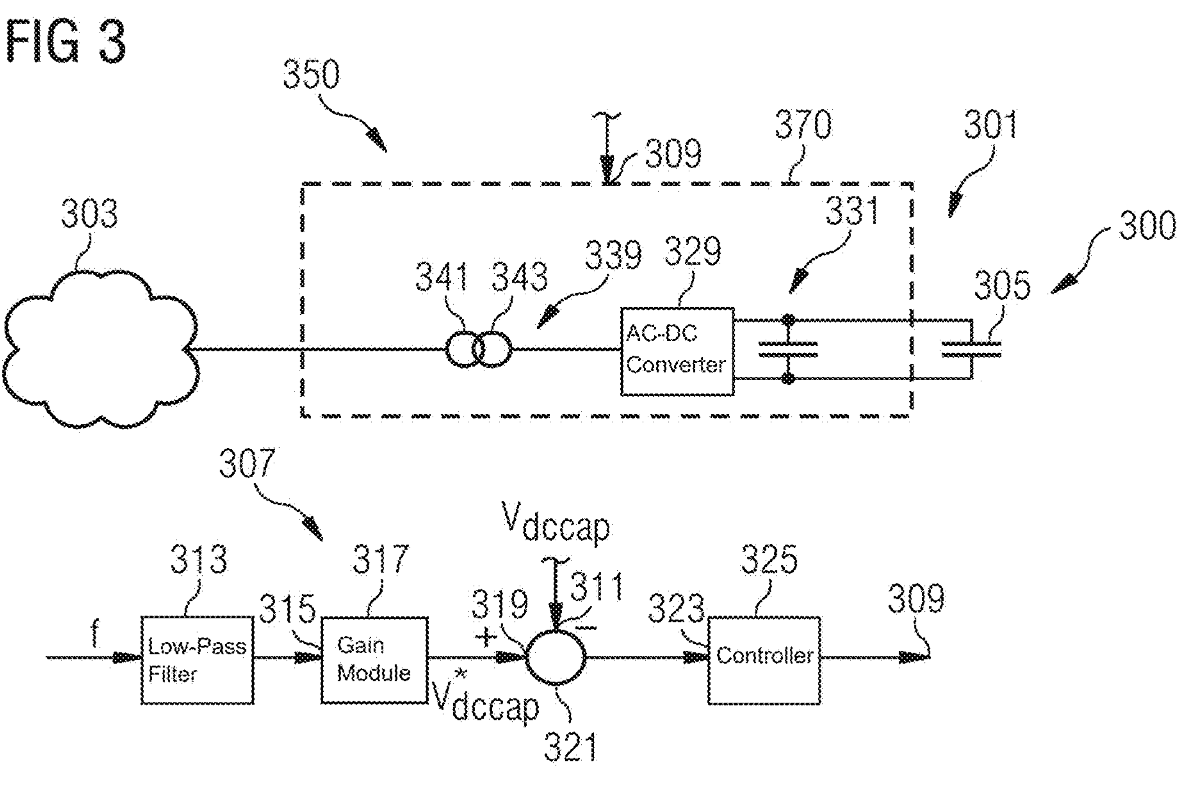
Figure 4:
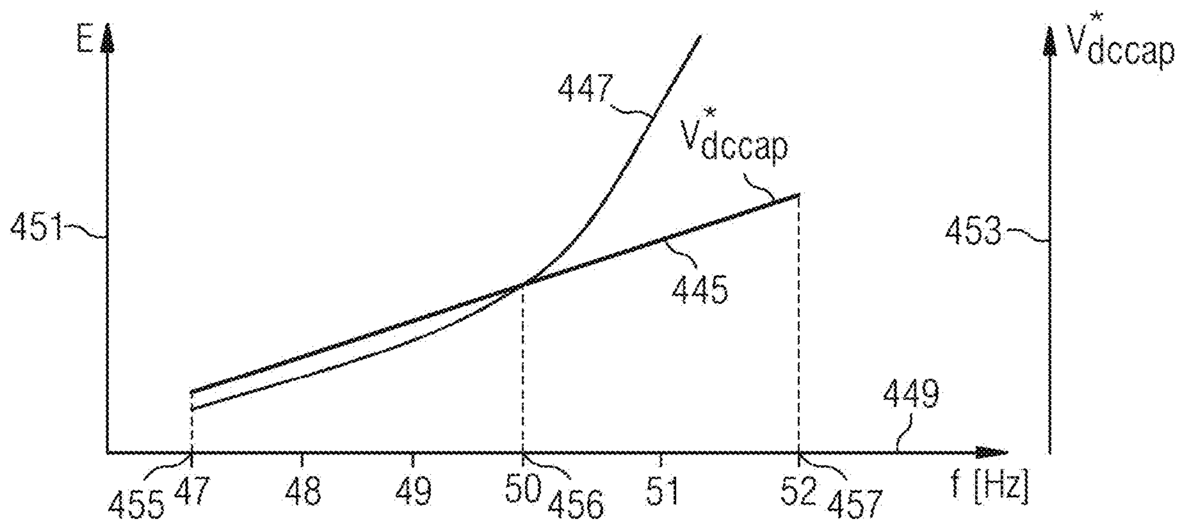

Some of the embodiments will be described in detail, with reference to the following figures, wherein like designations denote like members, wherein:

FIG. 1 schematically illustrates an energy storage system according to an embodiment of the present invention including an arrangement for controlling an energy storage device according to an embodiment of the present invention;

FIG. 2 schematically illustrates an energy storage system according to another embodiment of the present invention including an arrangement for controlling an energy storage device according to an embodiment of the present invention;

FIG. 3 schematically illustrates an energy storage system according to still another embodiment of the present invention including an arrangement for controlling an energy storage device according to an embodiment of the present invention;

FIG. 4 illustrates a graph for depicting the dependency of the energy stored in the energy storage device from the system frequency; and FIG. 5 schematically illustrates a wind-farm including a wind turbine according to an embodiment of the present invention.

DETAILED DESCRIPTION

Elements similar in structure and/or function illustrated in the different FIGS. 1, 2, 3 and 5 are illustrated with reference signs differing only the first digit. A description of an element not explicitly described with reference to a particular drawing may be taken from a description of this element with respect to another drawing.

The energy storage system 100 comprises an energy storage device 101 and an arrangement 150 for controlling an energy storage device 101 arranged to provide frequency support for an AC power system 103. The energy storage device 101 is configured as an energy storage capacitor 105.

The arrangement 150 comprises a processing module 107 which is adapted to set an amount of energy stored in the energy storage device 101 depending on a power system frequency f of the AC power in the AC power system 103. The arrangement 150 is adapted to carry out a method of controlling an energy storage device according to an embodiment of the present invention. Thereby, the arrangement 150 comprises an energy supply device 170 which is connected to exchange energy with the energy storage device 101 based on a control signal 109 which is output by the processing module 107. The control signal 109 is derived by the processing module 107 depending on the power system frequency f and further depending on a charging state indicating signal 111. In the embodiment as illustrated in FIG. 1, the control signal 109 indicates a reference charging current $I^*_{dccap}$ representing a reference value for the charging/discharging current of the energy storage capacitor 105. The charging state indicating signal 111 is represented by the voltage $V_{dccap}$ of the energy storage capacitor 105.

Using a low-pass filter 113, the AC power system frequency f is filtered to derive a low-pass filtered frequency 115. The low-pass filter frequency 115 is input to a gain module or look-up table 117 which outputs based on the filtered frequency a reference value 119. In the embodiment illustrated in FIG. 1 the reference value 119 is a reference voltage for the energy storage capacitor 105, namely $V^*_{dccap}$.

The reference signal 119 is supplied to a difference element 121 which receives the charging state indicating signal 111 in order to derive an error signal 123 being the difference between the reference signal 119 and the charging state indicating signal 111.

The error signal 123 is supplied to a controller 125, such as but not limited to, a PI controller, which derives from the error signal 123 the control signal 109. The controller 125 is tuned to derive the control signal 109 such that the error signal 123 becomes lower and lower. The control signal 109 is supplied to control the energy supply device 170.

The energy supply device 170 comprises a reactor (optional) 127, an AC-DC converter 129, a DC link 131 and a DC-DC converter 133. The control signal 109 controls the AC-DC converter 129 and/or the DC-DC converter 133 to supply a desired charging current $I^*_{dccap}$ to the energy storage capacitor 105, to thereby control the voltage $V_{dccap}$ of the capacitor 105.

FIG. 2 schematically illustrates an energy storage system according to another embodiment of the present invention. The embodiment 200 of the energy storage system differs from the embodiment 100 illustrated in FIG. 1 in that the processing module 207 derives a reference rotational speed 219 (ω*) of a flywheel 235 (representing the energy storage device 201). Using the subtraction element 221, the actual rotational speed ω (representing the charging state indicating signal 211) is subtracted from the reference rotational speed ω* to derive an error value 223 of the rotational speed which is supplied to the controller 225. The controller 225 derives based on the error rotational speed 223 a torque indicating signal as the control signal 209.

In the embodiment 200 the energy storage device 201 is implemented as a flywheel 235. The flywheel 235 is driven by a flywheel driver 237, for example implemented as an electric motor, which is part of the energy supply device 270. The energy supply device 270 comprises besides the AC-DC converter 229 and the DC link 231 a DC-AC converter 234, which is connected to the DC link 231 and which is connected to the flywheel driver 237.

The torque control signal 209 controls the AC-DC converter 229 and/or the DC-AC converter 234 and/or the flywheel driver 237 to set the desired rotational speed of the flywheel 235.

FIG. 3 schematically illustrates an energy storage system 300 according to a still further embodiment of the present invention. The embodiment 300 has similarities to the embodiment 100 illustrated in FIG. 1, but differs in the energy supply device 370. The energy supply device 370 comprises the reactor 327 (optional) and comprises a step down transformer 339 which allows changing the voltage from a primary coil 341 which is connected to the AC power system 303 to a secondary coil 343 which is connected to the AC-DC converter 329 which is connected to the DC link 331 and finally connected to the energy storage capacitor 305 as the energy storage device 301.

The scheme of FIG. 3 may have the same controller 325 as that shown in FIG. 1, in that it is the DC link VdcCap which is changed. With the step down transformer 339 of FIG. 3, this means that the DC link voltage VdcCap can be changed over a much wider range (approx. 1 to 0.5 pu) and thus more energy can be exchanged with the capacitor, than in the scheme of FIG. 1. In this sense the scheme of FIG. 1 is quite limited, but could be viable if connecting to a lower voltage connection point.

The processing module 307 derives from the voltage error 323 (derived has been described with reference to FIG. 1) using the controller 325 a control signal 309. The control signal 309 is supplied to the converter 339 in order to adjust the voltage (at the DC-link 331 and) applied to the energy storage capacitor 305.

FIG. 4 illustrates curves 445, 447 in a coordinate system having an abscissa 449 representing the AC power system frequency, having a first ordinate 451 representing the amount of energy stored in the energy storage device and having a second ordinate 453 representing the voltage at one of the energy storage capacitors 105, 305 illustrated in FIG. 1 or 3.

As an example of an AC power system, in the United Kingdom the power system is operated between a lower power system frequency limit 455 being for example 47 Hz and an upper power system frequency limit 457 being for example 52 Hz. The nominal frequency 456 is for example 50 Hz. The amount of energy stored in the energy storage device (for example 105, 235, 305 illustrated in FIGS. 1, 2, 3) increases with increasing AC power system frequency according to the curve labeled with reference sign 447.

If the energy storage system is for example an energy storage capacitor, such as capacitor 105 or 305 illustrated in FIG. 1 or 3, the voltage reference of the capacitor $V^*_{dccap}$ is changed in dependence of the frequency f according to the curve 445, i.e., in a linear manner. Thus, the reference voltage $V^*_{dccap}$ of the energy storage capacitor may linearly depend on the AC power system frequency f. In other embodiments the energy storage capacitor may depend on the AC power system frequency f not linearly but more optimally which may be slightly non linearly.

According to embodiments of the present invention, the method for controlling the energy storage device may utilize a filtered version of the AC system frequency and may derive from that a DC link voltage reference for the energy store, if the energy store is an energy storage capacitor, such as a supercapacitor. This may reduce the cost of the energy store as there is no need to store sufficient energy or have the capability to sink sufficient energy for the worst case (5 Hz) delta frequency across the entire frequency range (in this example 47 to 52 Hz).

The embodiment illustrated in FIG. 2 utilizes a flywheel and regulates the speed of the flywheel and controls the energy store based on the AC power system frequency, either measured or using a controller internal view of the frequency. Extension to other energy storage mechanism may be possible and these may be DC connected via a DC-DC converter or may be AC connected via a DC-AC converter onto the main DC link of the power converter.

The embodiment 300 as illustrated in FIG. 3 uses a step-down transformer 339 to which the energy storage capacitor is connected and regulates the DC link voltage (at the DC link 331) as a function of the AC system frequency. In this scheme, if the AC voltage is stepped-down to 50%, then the dynamic range of the DC link can be twice, hence, the energy storage capacity can be discharged to 50%.

The converter shown in FIGS. 1 to 3 can be shunt-connected converters or can be part of the main power converter DC link. The arrangement may be included in for example a wind turbine.

FIG. 3 is expected to be suitable for a use with a shunt-connected converter. Embodiments of the present invention envisage as implementation of the energy storage device any energy storage medium, including super-conductive or inductive energy storage schemes.

Figure 5:
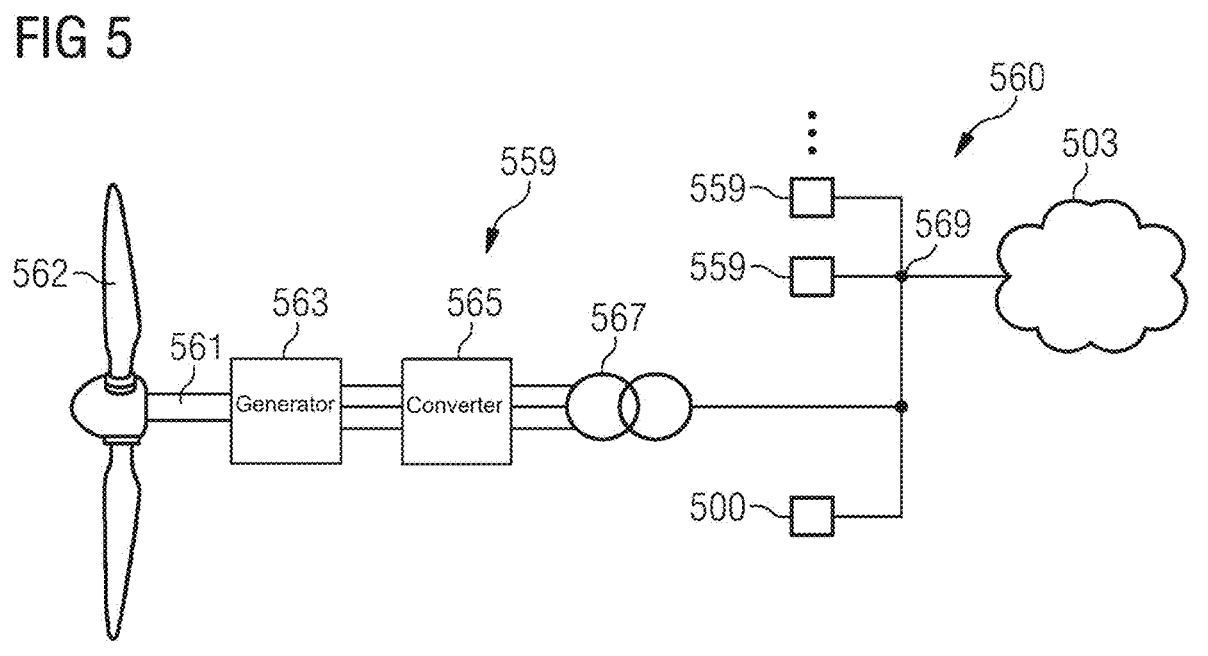

FIG. 5 schematically illustrates a wind-park 560 comprising at least one wind turbine 559 according to an embodiment of the present invention. The wind turbine 559 comprises a rotation shaft 561 to which plural rotor blades 562 are mounted. The wind turbine 559 further comprises a generator 563 coupled to the rotation shaft. The power stream output by the generator is converted by a converter 565 and supplied to a wind turbine transformer 567 which delivers the power stream to a point of common coupling 569 to which other wind turbines 559 are connected. The common connection node 569 is connected to the AC power system 503.

The wind turbine 559 further comprises an energy storage system 500 such as energy storage system 100, 200, 300 illustrated in FIGS. 1, 2, 3. The energy storage system 500 is also connected to the point of common coupling 569. In other embodiments, the energy storage system 500 may be connected at the wind turbine converter 565, for example at a DC link between a generator side converter portion and a utility grid converter portion or connected on the low voltage side of a turbine transformer.

"Setting the amount of energy" can comprise the steps of (a) deriving a target value for the amount of energy to be stored in the storage device, and (b) controlling the amount of energy in the storage device such that the target value is reached.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling an energy storage device arranged to provide frequency support for an AC power system, the method comprising:

setting an amount of energy stored in the energy storage device depending on a power system frequency of the AC power in the AC power system, wherein the energy storage device comprises an energy storage capacitor, wherein setting the amount of energy stored in the energy storage capacitor depending on the power system frequency comprises setting a voltage of the energy storage capacitor depending on the power system frequency, wherein an energy supply device comprises an AC-DC converter connected to the AC power system and a DC-link, wherein the energy supply device further comprises a DC-DC converter connected to the DC-link, the DC-DC converter being connected to the energy storage capacitor, and wherein the AC-DC converter and/or the DC-DC converter is controlled by a control signal, and wherein setting the amount of energy stored in the energy storage device comprises:

deriving a charging or discharging action depending on the power system frequency and a charging state indicating signal of the energy storage device, wherein deriving the charging or discharging action comprises:

deriving the control signal depending on the power system frequency and the charging state indicating signal; and controlling the energy supply device, connected to exchange energy with the energy storage device, based on the control signal.

2. The method according to claim 1, wherein the energy storage capacitor comprises a supercapacitor and/or an electrolytic capacitor.

3. The method according to claim 1, wherein the control signal is for controlling the voltage at the energy storage capacitor.

4. The method according to claim 1, wherein the energy supply device comprises a tap transformer connected to the AC power system, the AC-DC converter being connected to the tap transformer, and wherein the AC-DC converter is controlled by the control signal for controlling the voltage at the DC side and at the energy storage device.

5. The method according to claim 1, wherein the energy storage device comprises an energy storage flywheel, wherein the AC-DC converter being connected to a flywheel driver for the flywheel, and wherein the AC-DC converter and/or the flywheel driver is controlled by the control signal for controlling a rotational speed of the flywheel.

6. The method according to claim 1, wherein a frequency signal is obtained by measuring the power system frequency and low pass filtering the measured power system frequency.

7. The method according to claim 1, wherein the charging state or amount of energy of the energy storage device or voltage at the energy storage device is set such that the higher the power system frequency above a nominal power system frequency, the higher the charging state or amount of energy of the energy storage device or voltage at the energy storage device, and/or wherein the charging state or amount of energy of the energy storage device or voltage at the energy storage device is set such that the lower the power system frequency below a nominal power system frequency, the lower the charging state or amount of energy of the energy storage device or voltage at the energy storage device.

8. The method according to claim 1, wherein the charging state or amount of energy of the energy storage device is set such that the closer the power system frequency to an upper power system frequency limit, the higher the charging state or amount of energy of the energy storage device or voltage at the energy storage device, and/or wherein the charging state or amount of energy of the energy storage device is set such that the closer the power system frequency to a lower power system frequency limit, the lower the charging state or amount of energy of the energy storage device or voltage at the energy storage device.

9. The method according to claim 1, wherein the energy storage device and the energy supply device are arranged to supply active energy to the AC power system, if the power system frequency falls below the nominal power system frequency and if further the rate of change of the frequency is negative, and/or wherein the energy storage device and the energy supply device are arranged to receive active energy from the AC power system, if the power system frequency exceeds above the nominal power system frequency and if further the rate of change of the frequency is zero or positive.

10. An arrangement for controlling an energy storage device arranged to provide frequency support for an AC power system, the arrangement comprising:

a processing module adapted to set an amount of energy stored in the energy storage device depending on a power system frequency of the AC power in the AC power system, wherein the energy storage device comprises an energy storage capacitor, wherein setting the amount of energy stored in the energy storage capacitor depending on the power system frequency comprises setting a voltage of the energy storage capacitor depending on the power system frequency, wherein an energy supply device comprises an AC-DC converter connected to the AC power system and a DC-link, wherein the energy supply device further comprises a DC-DC converter connected to the DC-link, the DC-DC converter being connected to the energy storage capacitor, and wherein the AC-DC converter and/or the DC-DC converter is controlled by a control signal, and wherein the amount of energy stored in the energy storage device comprises:

a charging or discharging action derived from the power system frequency and a charging state indicating signal of the energy storage device, wherein the charging or discharging action comprises:

the control signal derived from the power system frequency and the charging state indicating signal; and wherein the energy supply device is controlled, connected to exchange energy with the energy storage device, based on the control signal.

11. An energy storage system, comprising:

the energy storage device comprising the energy storage capacitor according to claim 10.

12. A wind turbine, comprising:

a rotation shaft to which plural rotor blades are connected;

a generator driven by the rotation shaft;

a generator converter connected to the generator and connectable to the AC power system; and the energy storage system according to claim 11.

* * * * *